United States Patent
Wang et al.

(10) Patent No.: US 7,068,720 B2
(45) Date of Patent: Jun. 27, 2006

(54) CODING OF DIGITAL VIDEO WITH HIGH MOTION CONTENT

(75) Inventors: Meng Wang, Vancouver (CA); Li Qu, Fremont, CA (US); Jian Wang, Burnaby (CA)

(73) Assignee: DAC International Inc., St. Michael (BB)

(*) Notice: Subject to any disclaimer, the term of this patent is extended or adjusted under 35 U.S.C. 154(b) by 296 days.

(21) Appl. No.: 09/999,067

(22) Filed: Nov. 15, 2001

(65) Prior Publication Data

US 2002/0159529 A1 Oct. 31, 2002

(30) Foreign Application Priority Data

Mar. 15, 1999 (CA) .................................... 2300729
Mar. 15, 2001 (WO) ...................... PCT/CA01/00319

(51) Int. Cl.
*H04B 1/66* (2006.01)
*H04N 11/02* (2006.01)
*H04N 11/04* (2006.01)
*H04N 7/12* (2006.01)

(52) U.S. Cl. ................................................ 375/240.12

(58) Field of Classification Search ............ 375/240.12, 375/240.02, 240.16, 240.23, 240.24; 348/394.1, 348/401.1, 402.1, 409.1, 414.1, 417.1, 418.1; H04N 7/12
See application file for complete search history.

(56) References Cited

U.S. PATENT DOCUMENTS

| 5,247,357 | A | * | 9/1993 | Israelsen ................ 375/240.12 |
| 5,844,613 | A | * | 12/1998 | Chaddha ................ 375/240.12 |
| 6,072,830 | A | * | 6/2000 | Proctor et al. ......... 375/240.22 |
| 6,611,800 | B1 | * | 8/2003 | Nishiguchi et al. ......... 704/221 |
| 6,658,383 | B1 | * | 12/2003 | Koishida et al. ............ 704/229 |
| 6,760,745 | B1 | * | 7/2004 | Tan et al. .................... 709/203 |

* cited by examiner

*Primary Examiner*—Nhon Diep
(74) *Attorney, Agent, or Firm*—Pillsbury Winthrop Shaw Pittman LLP

(57) ABSTRACT

Methods for coding the current frame of a video data bit stream are provided. Methods include, for example, creating and maintaining a global codebook of historic values for the macroblocks of previous frames; searching entries in the global codebook to find the best estimation of the current frame and calculate a measure of the difference between values for the two macroblocks; comparing the effectiveness of the estimation macroblock provided by the global codebook entry to the estimation provided by a motion compensation scheme; choosing the best estimation method and coding the current frame; and updating the global codebook based on the new coded macroblock.

20 Claims, 12 Drawing Sheets

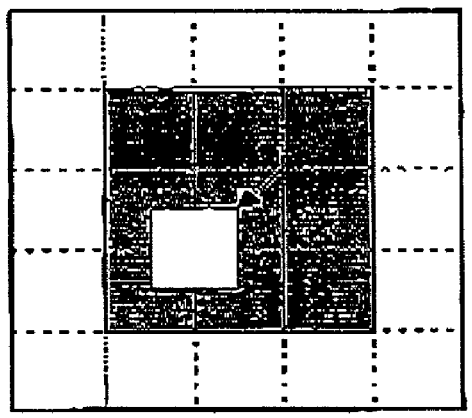 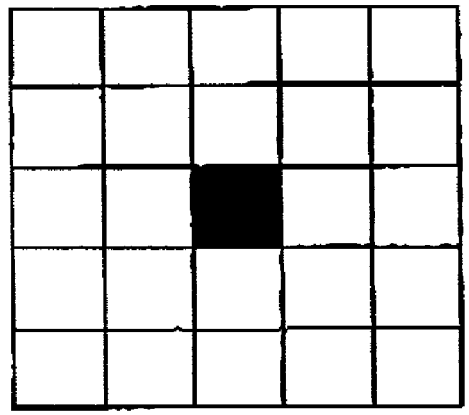
(a) Reference Frame  (b) Current Frame
Figure 1. Motion estimation
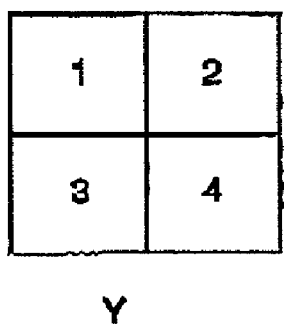  
Y  Cb  Cr
Figure 2. Luminance and chrominance signals in a macroblock

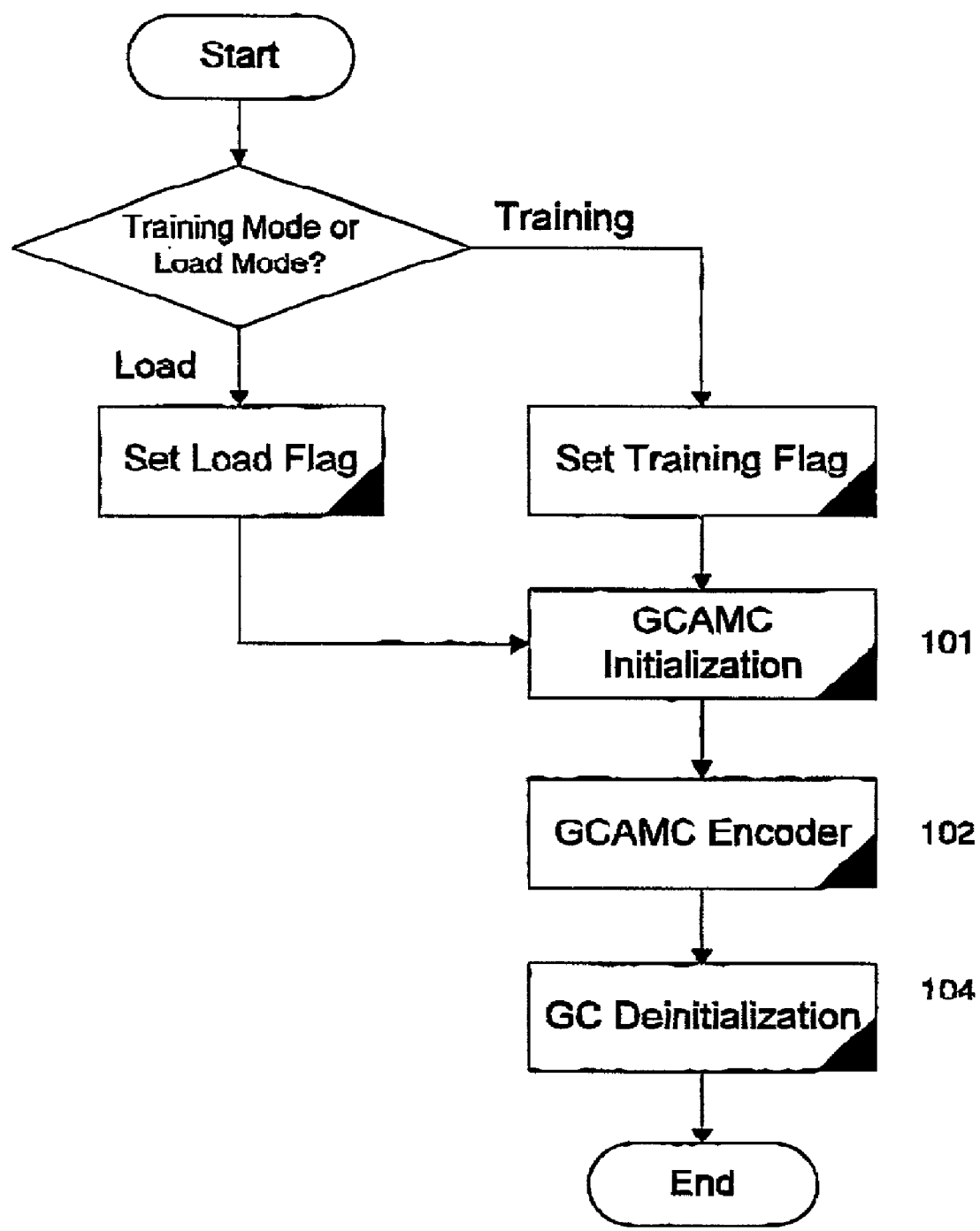
Figure 3. Encoding process

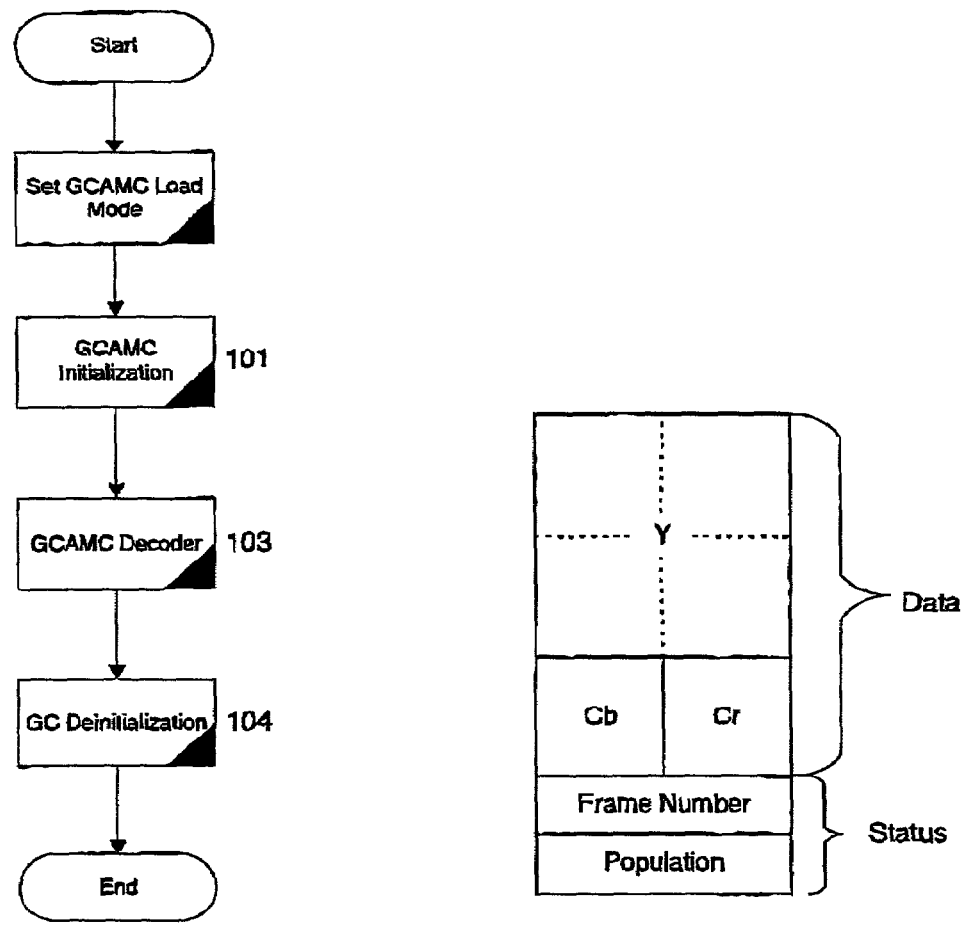
Figure 4. Decoding process
Figure 5. GCA data structure

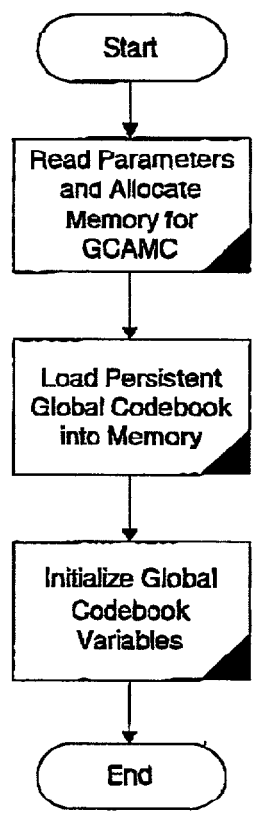
Figure 6. GCAMC initialization
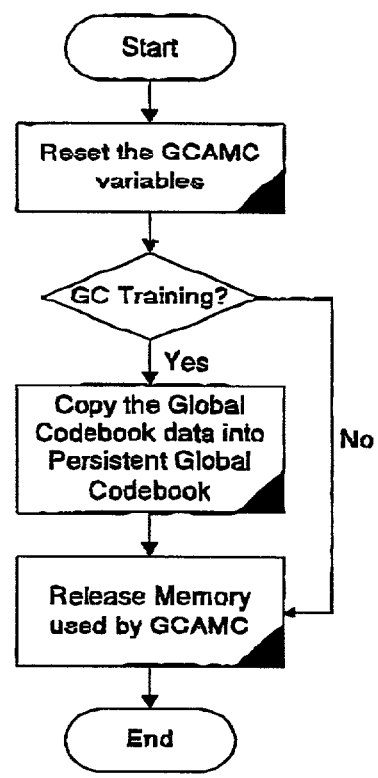
Figure 7. GCAMC deinitialization

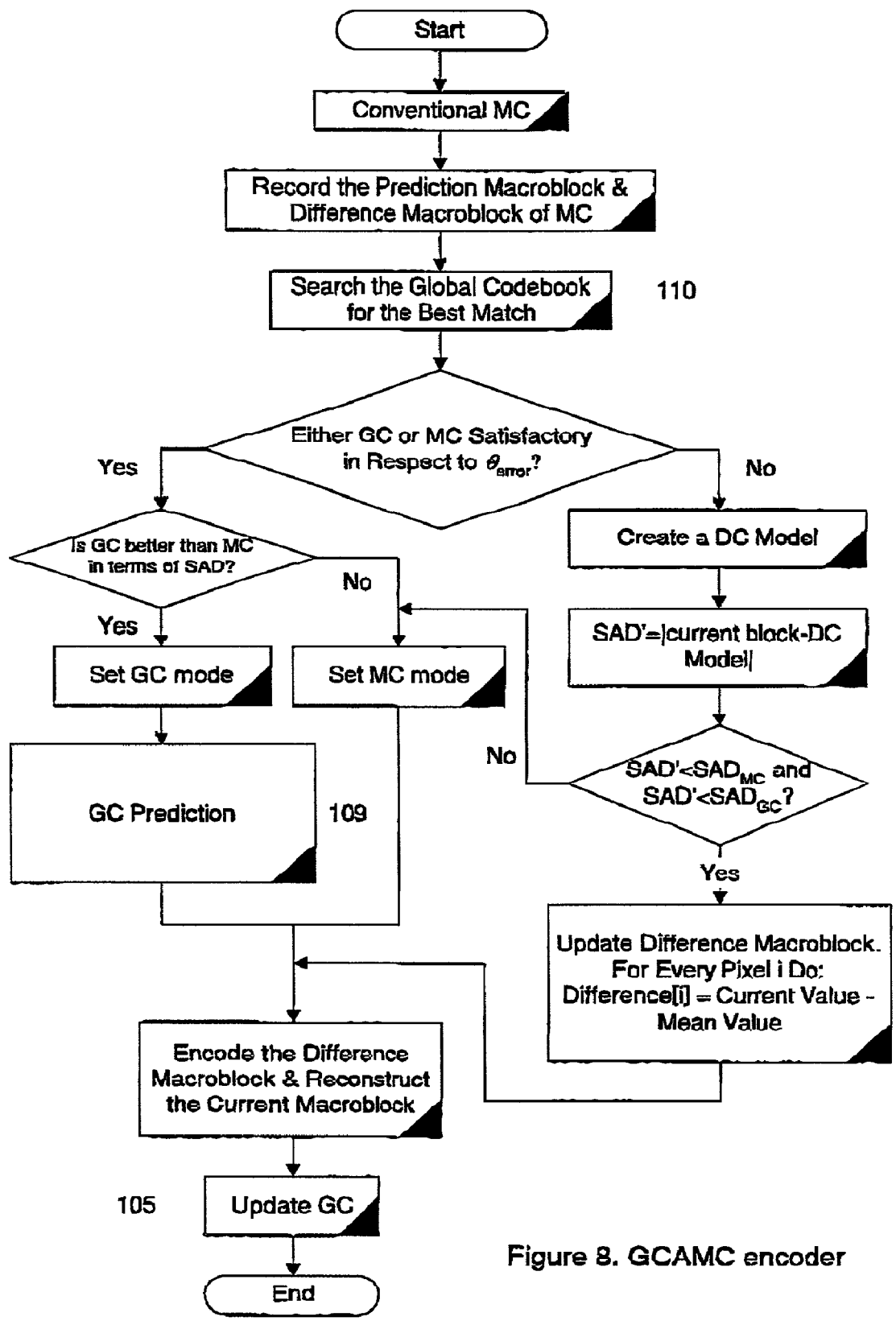
Figure 8. GCAMC encoder

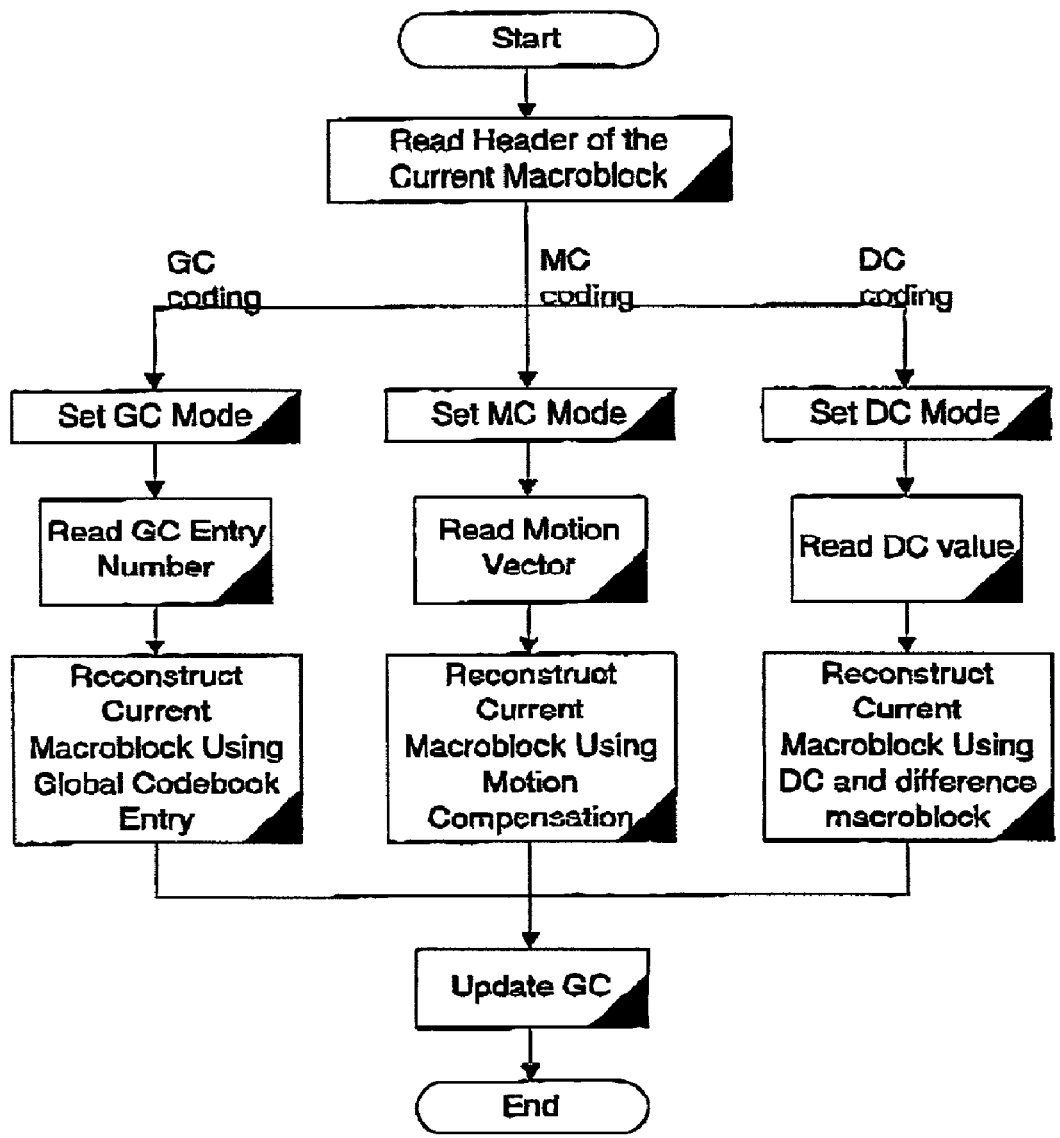
Figure 9. GCAMC decoder

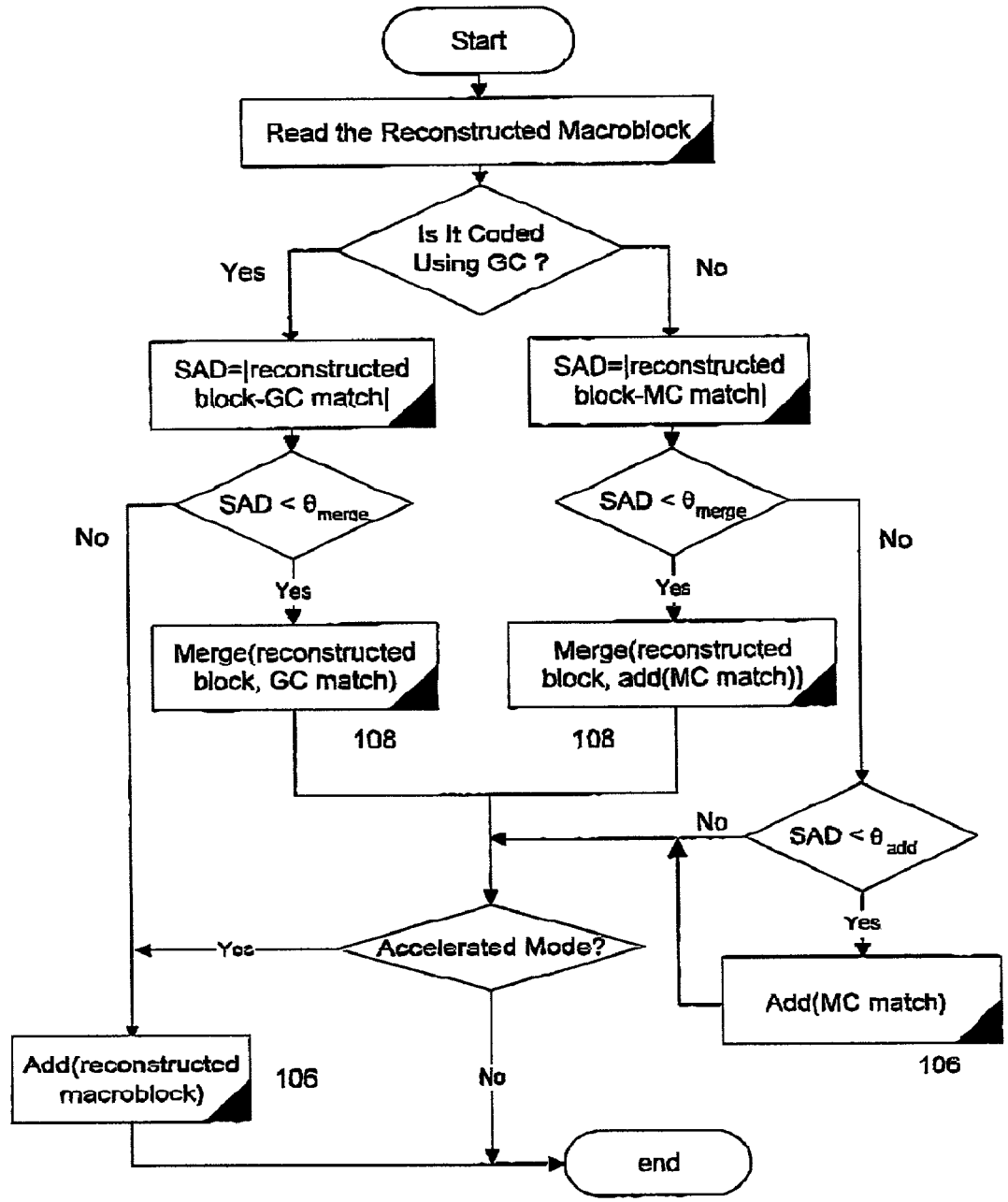
Figure 10. Update the global codebook

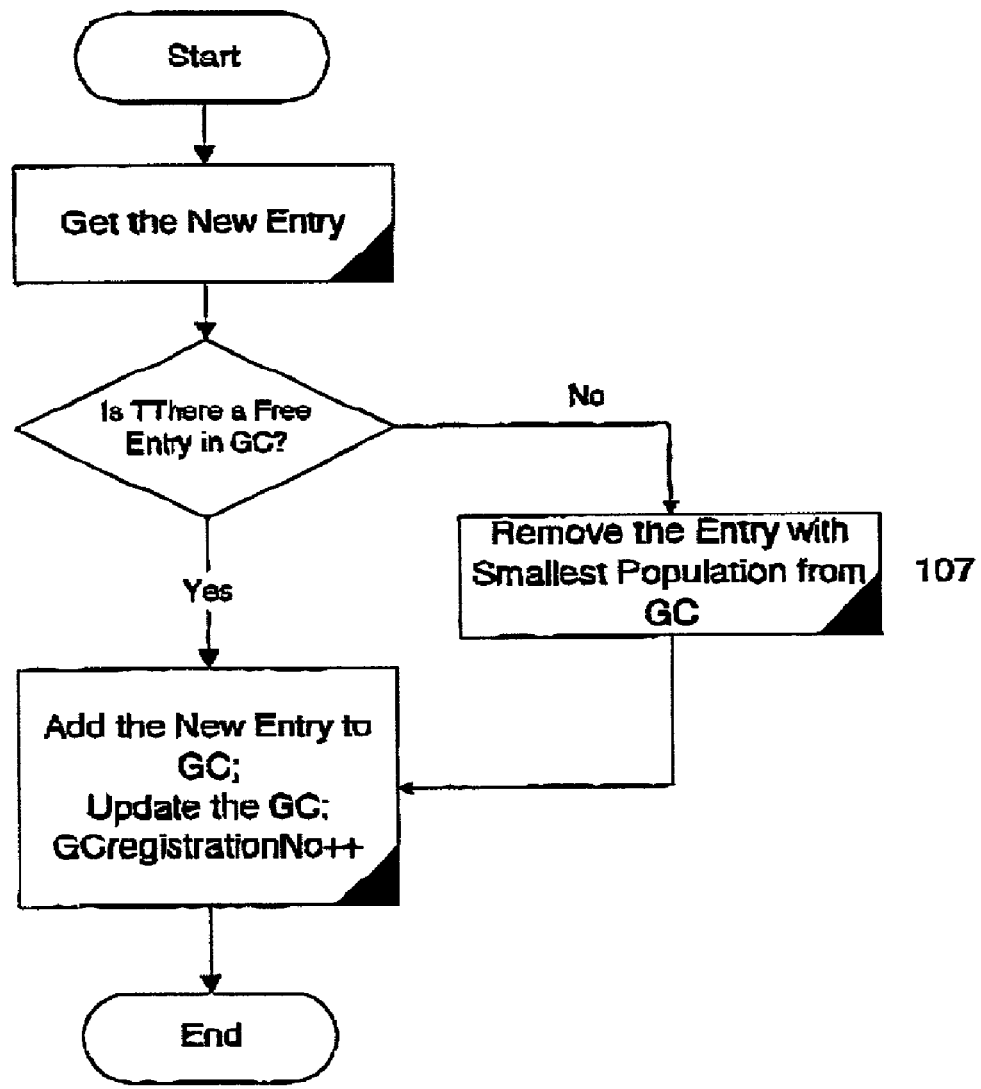
Figure 11. Add a new entry to the global codebook

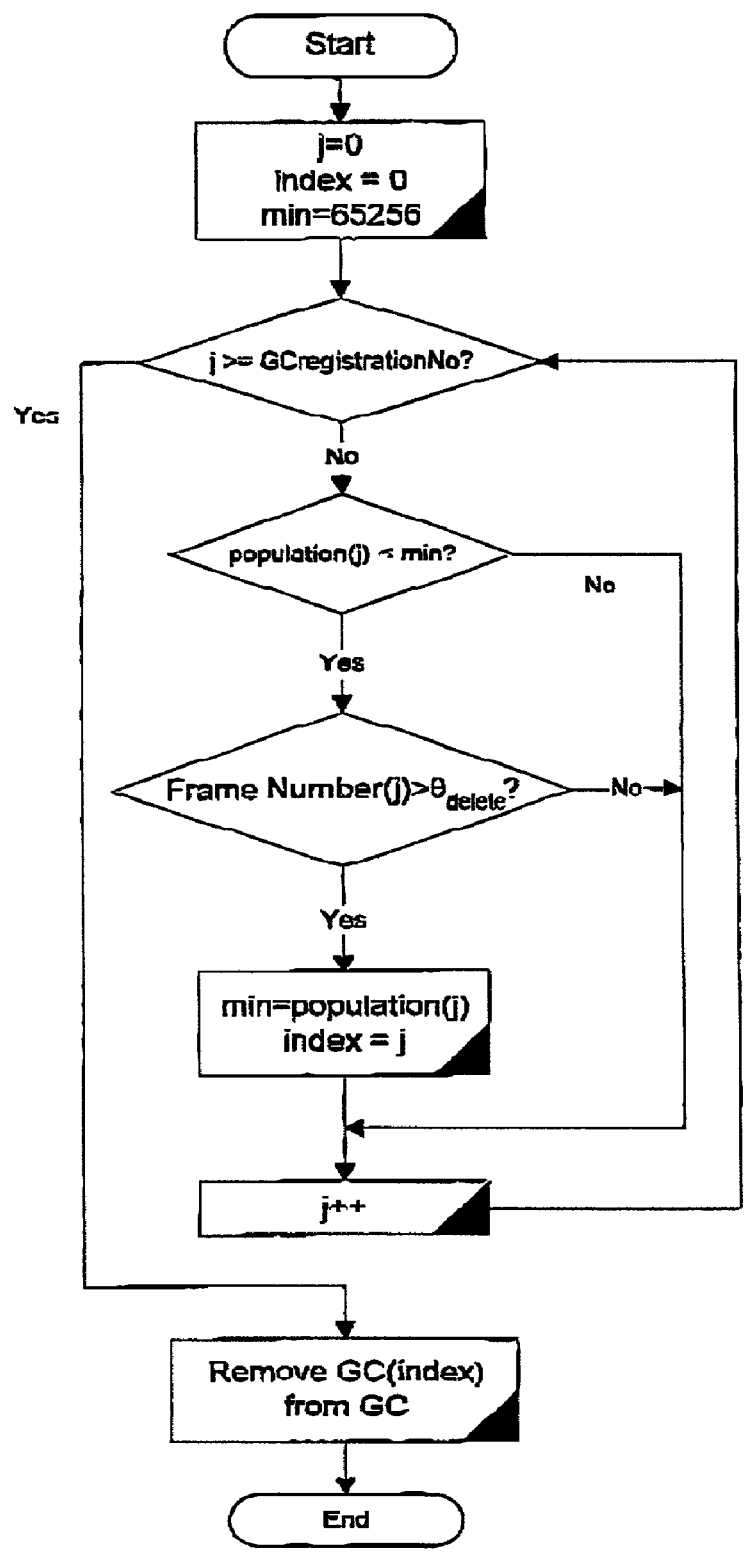
Figure 12. Remove the smallest GC entry

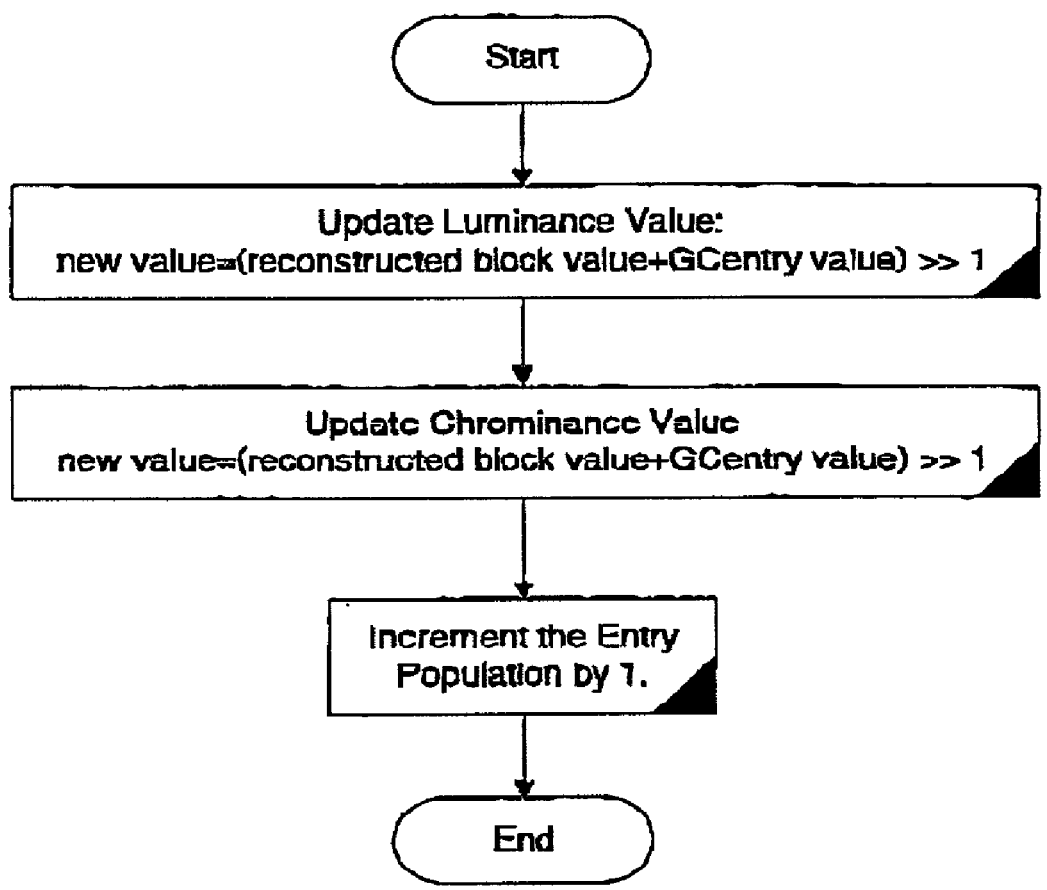
Figure 13. Merge the reconstructed macroblock with a GC entry

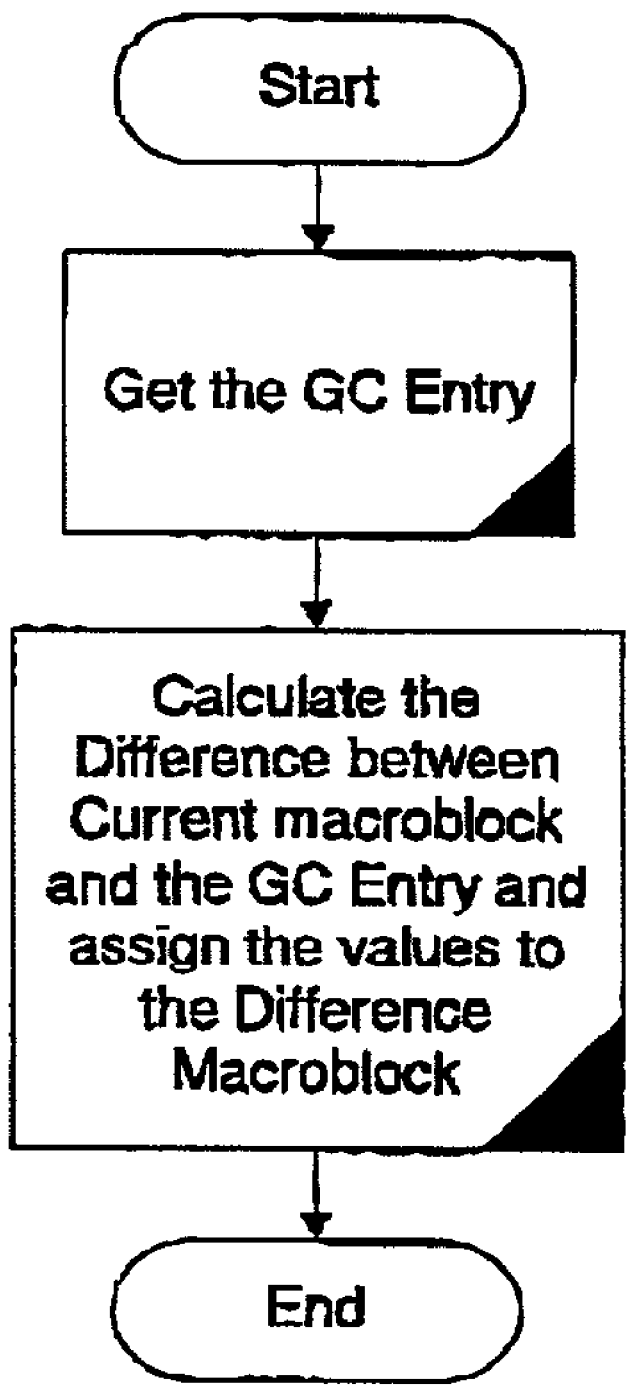
Figure 14. GC prediction

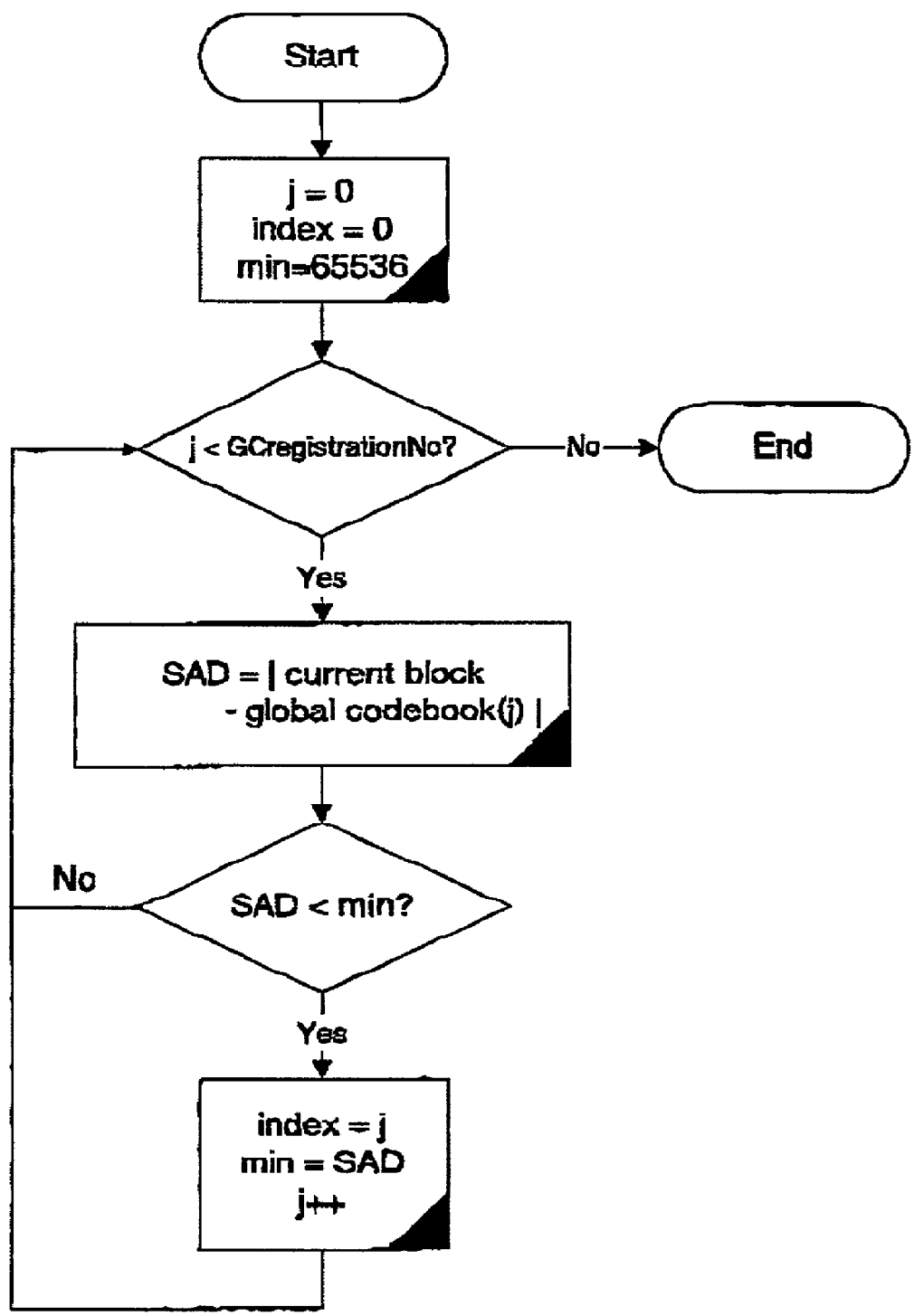
Figure 15. Search the global codebook for the best match of the current macroblock

CODING OF DIGITAL VIDEO WITH HIGH MOTION CONTENT

This application is a 371 of PCT/CA01/00319, filed Mar. 15, 2001, and claims priority to Canadian Patent Application 2,300,729, filed Mar. 15, 2000.

FIELD OF THE INVENTION

The present invention relates to the field of digital video coding, and more particularly to the efficient compression, transmission and decompression of scalable and content-based, randomly accessible digital video content.

BACKGROUND

The standard video compression algorithms (ISO MPEG, ITU H.261/263) use block-based motion compensation to exploit the temporal redundancy inherent in video data and to achieve compression. When the best match falls within the local search window of the reference frame, usually the immediately previous frame, the standard algorithms offer satisfactory compression ratios. However, if a good match can not be found in the reference frame, which very often occurs in video with high motion content, then a very high coding cost would have to be paid for the subject block. This is known as the non-locality disaster.

A new global motion compensation method is developed in the present invention to overcome the non-locality disaster. This method makes use of the information of the immediately previous frame as well as the information in all the previous frames in history. The present invention also makes use of information outside the conventional local search window.

Motion compensation is an important step in all video compression. The standard (H.261/263, MPEG) motion compensation algorithms employ a block-based strategy, where all the possible macroblocks in the local window of the reference frame are searched for the best match of each macroblock in the current frame. A second method of motion compensation found in some nonstandard algorithms apply global motion estimation and luminance invariance coding. The global motion estimation is the process to detect the potential global motions in the reference frame, create a new reference frame using global motion compensation, and predict the current frame based on this new reference frame. This global motion estimation method is usually helpful for dealing with camera movement such as pan, tilt, and zoom. Luminance invariance coding detects the same scene under different lighting conditions. Once luminance invariance is detected, the reference frame is warped to make it closer to the current frame.

Digital video content with high motion and change in large spatial scales is becoming more and more popular in new generation multimedia applications. Typical examples include video captured from sporting and entertainment events, from commercial materials, and from synthetic productions. A statistical majority of this high motion or "large change" content can not be effectively classified and treated using the techniques an methods described above.

The present invention restates the motion compensation objective as a vector quantization problem. Namely, if the subject macroblock (a square of 16×16 luminance values) is a 256-dimensional vector, then the local search window in the reference frame serves as a codebook for coding this macroblock. In this context, the best match represents the hit entry in the codebook and the motion vector represents the codeword—indexed to the codebook—under consideration.

In this conception, prior art motion compensation techniques can be properly characterized as a local codebook approach to vector quantization. That is to say that the codebook for coding the subject macroblock is built upon the information of a local window of the reference frame. It is spatially local because only a relatively small window in the reference frame is considered, and it is temporally local because only the immediately previous frame is referred to. This local codebook approach has two major limitations. First, when large motion changes occur in adjacent frames, the best match may fall outside of the relatively small local searching window. Secondly, this approach is unable to make use of a good match that may be found in a historically previous frame that is not the immediately previous frame. When any of these situations occurs, a high computing cost is paid for coding the subject block thus "the non-locality disaster".

The present invention improves upon the exclusively local codebook approach by building a codebook based on all the possible macroblocks in all temporally previous frames. Theoretically, this extension can be done by simply including more previous frames as reference and by enlarging the search window in those reference frames. As an extreme case, reference range can be as long as the whole history of the encoded sequence, and the search window can be of the size of the entire frame. However, this conceptually simple solution is unaffordable from computation cost viewpoint.

The present invention, may be called Global Codebook Aided Motion Compensation or GCAMC. GCAMC represents a simple and efficient method and system to make use of the spatial and temporal information of previously coded macroblocks. In the present invention, the information regarding previously coded macroblocks is quantized and saved in a global codebook, and the global codebook is updated dynamically in both the encoding and decoding environments. A dual, comparative motion compensation process is performed using both the local search window and the global codebook. This allows the coding system both to take advantage of the local codebook should there be little motion and to make use of information in the global codebook if the change is dramatic.

The principal objective of the present invention is to provide a new method and a system for the compression coding and decompression of digital video content with high motion and dramatic content changes.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

A key component of the present invention is a global codebook that represents an adaptively optimal vector quantization of the previous coded history. The present invention includes a set of real-time algorithms designed for accessing and updating this codebook in the course of encoding and decoding. Further a comparative motion compensation scheme has been developed that utilizes both the local search window and the global codebook. The present invention is thereby enabled to take advantage of both the local codebook in cases where motion and dramatic changes are relatively small and to make use of the global codebook if there is a lot of motion and the changes are dramatic.

A supervised training strategy is developed to produce a persistent global codebook. A persistent global codebook is originally obtained by applying the present invention to a training set of video clips and saving the requiring data sets into a default global codebook. This assumes that naturally occurring scenes do not produce random signals but rather contain certain regularities and patterns. It is both sensible and effective to first learn these patterns from a representative training set. The trained global codebook can then be used for coding purposes as an initial default setting.

In accordance with another aspect of the invention, there is provided a method for coding the current frame of a video data bit stream comprising the steps of:
 a) creating and maintaining a global codebook of historic values for the macroblocks of previous frames;
 b) searching entries in the global codebook to find the best estimation of the current frame and calculate a measure of the difference between the values for the two macroblocks;
 c) comparing the effectiveness of the estimation macroblock provided by the global code book entry to the estimation provided by the standard, prior art MPEG or H.263 motion compensation schemes;
 d) choosing the best estimation method and coding the current frame;
 e) updating the global codebook based on the new coded macroblock.

The present invention is an adaptive scheme and can be used with any type of video content. Its peak performance is observed when dealing with content with high motion and dramatic changes, where the present invention improves compression ratios considerably when compare to prior art algorithms. Another embodiment of the present invention may be used with other compression modes and with the options of an H.261/263 or MPEG encoder. Another embodiment of the present invention further possesses backward compatibility with those standards. The computational burden of the present invention falls to a great extent on the encoding component. The decoding component of the current invention is only marginally slower than those of the present standards. In a worst-case scenario, the encoder of the present system is only twice as computationally busy as current standards.

BRIEF DESCRIPTION OF THE FIGURES

FIG. 1: an illustration of the standard, prior art block-based motion estimation process.

FIG. 2: content of a macroblock in standard digital video coding.

FIG. 3: general encoding process of the present invention.

FIG. 4: general decoding process of the present invention.

FIG. 5: data structure of a global codebook entry.

FIG. 6: The initialization of the system of the present invention.

FIG. 7: The de-initialization of the system of the present invention.

FIG. 8: a block diagram of the encoder of the present invention.

FIG. 9: a diagram of the decoder of the present invention.

FIG. 10: the logic process of updating the global codebook.

FIG. 11: the algorithm of adding a new entry to the global codebook.

FIG. 12: the algorithm to remove the entry with smallest population from the global codebook.

FIG. 13: the algorithm to merge the reconstructed macroblock with a global codebook entry.

FIG. 14: the prediction process of the invented system when a macroblock is coded using a global codebook entry.

FIG. 15: the process of searching the global codebook for the best match.

DETAILED DESCRIPTION OF THE INVENTION

The prior art, standard block-based motion estimation process is illustrated in FIG. 1, where a local window in the reference frame is searched for the best match of a macroblock in the current frame, aiming to exploit any temporal redundancy. The black box in (b) is the subject macroblock to be coded in the current frame. The gray area in (a) is the local search window and each pixel position in this window is searched for the best match of the macroblock in terms of the sum of absolute difference (SAD). The white box in (a) illustrates the best match found in the search window and the arrow represents the motion vector (MV) used to indicate orientation from the subject macroblock.

FIG. 2 shows the content of a macroblock in 3-channel color digital video. The luminance channel (Y) mainly carries shape information and the chrominance channels (Cb and Cr) contain color information. The chrominance signal is usually down-sampled in spatial resolution. The down-sampling scheme for luminance and chrominance channels is 4:1:1 in the prior art MPEG and H.263 standards. The same scheme is adopted in the present invention. Each macroblock contains four 8×8 Y (luminance) blocks and two 8×8 chrominance blocks, one for Cb, and the other for Cr.

FIG. 3 shows the general encoding process using the method of the present invention. There are two modes in which the encoding process may work. In the training mode, the encoding process is performed with a set of sample video clips to produce the persistent global codebook. In load mode, the persistent global codebook is used to encode the desired video content. In this general encoding process, the initialization step and the encoding step are the same for both modes, and the de-initialization step varies between the two modes (see FIG. 7).

FIG. 4 illustrates the general decoding process using the method of the present invention. Unlike the encoding process, decoding operates only in load mode. The decoding process involves three steps: initialization, decoding, and de-initialization, where the initialization and de-initialization steps are the same as in the encoding process.

FIG. 5 shows the data structure for global codebook entry. The global codebook is a collection of codebook entries containing information about the historically coded macroblocks. The data field of a global codebook entry contains a macroblock of 16×16 luminance values and the two associated blocks of chrominance values. A global codebook entry also has a status field. The frame number indicates the most recent frame number in which this global codebook entry was referred. The population records the total number of hits on this entry in history.

FIG. 6 is the initialization process of the present invention. The necessary parameters are read into memory from a file and the global codebook entries are initialized using the persistent global codebook. The parameters of this element the invented system include:

The satisfaction factor of match $\theta_{error}$, which measures the degree of satisfaction for a match in MC or global codebook to be a good model for the subject macroblock.

The threshold $\theta_{add}$ for adding a prediction macroblock to the global codebook.

The threshold $\theta_{merge}$ for merging the subject or prediction macroblock with an existing global codebook entry.

The threshold $\theta_{delete}$ for deleting an entry from the global codebook.

The total number of global codebook entries $N_{GC}$ (the embodiment setting is 1024).

In order for present invention to operate as designed, the following relation must be met while implementing his method:

$$\theta_{merge} < \theta_{add} < \theta_{error}$$

In this embodiment of the current invention, the values for these parameters are $\theta_{error}=7000$, $\theta_{add}=1500$, and $\theta_{merge}=600$. The value for $\theta_{delete}$ is set to protect the most recent global codebook entries from being removed from the global codebook. The current embodiment for this value is 1.

FIG. 7 illustrates the de-initialization process of the present invention. If the system is in training mode, the content of global codebook entries is saved to the persistent global codebook. Otherwise, the content of the global codebook is discarded. The system variables are reset and the dedicated memory is released.

FIG. 8 is a logic diagram of the invented algorithm for the encoder component of the present invention. This component of the invention uses a combination of local motion compensation and global vector quantization, which includes four major steps:

1) standard local motion estimation is applied;
2) a search of the global codebook is performed and the results of local motion estimation and global codebook search are compared (the comparative coding);
3) if the global codebook match is superior, the macroblock is coded using the appropriate global codebook match; if the local motion estimation results are superior this macroblock is coded using the motion compensation match;
4) the global codebook is updated.

The algorithm for local motion compensation may be identical or similar to standard MPEG motion compensation schemes and the description of these schemes is not considered in this specification. A detailed description of global codebook search is set out below and illustrated in FIG. 15.

The evaluation of results of motion estimation and global codebook search is performed for both luminance and chrominance data, which gives a better assessment than using only luminance data. A good match in the luminance channel does not necessarily correspond to a good match in chrominance channels. The evaluation is to see whether the global codebook or motion compensation provides a satisfactory model for the subject macroblock. The quantitative measurement for the satisfaction of this comparative process is to compare $SAD_{GC}$ of the global codebook and $SAD_{MC}$ of the motion compensation respectively with the pre-defined tolerance value $\theta_{error}$. There are two outcomes in testing the result of this comparison.

When both motion estimation and global codebook search are not satisfactory in respect to $\theta_{error}$, a new model (the DC model) is created to represent the current macroblock. In the DC model, the mean of all luminance values and the mean of all chrominance values for the current macroblock are calculated, respectively, and all the original values in this macroblock are replaced by the mean values. A new sum of the absolute difference (SAD') is calculated to measure whether the DC model is satisfactory. If it is a better model than both the global codebook and motion compensation methods, it is adopted as a code for the subject macroblock. In this case, the different macroblock is updated to be the difference between every pixel value and the mean. If each of these models, namely the GC, MC, and DC are all unsatisfactory, or $$SAD_{GC} > \theta_{error}, SAD_{MC} > \theta_{error}, SAD' > SAD_{MC} \text{ and } SAD' > SAD_{GC},$$

then the best match in MC is chosen as the code for the subject macroblock.

If any of $SAD_{GC} \leq \theta_{error}$ or $SAD_{MC} \leq \theta_{error}$ holds, then we say that a good model for the subject macroblock is found in either the local search window or the global codebook. In this case, a further test is performed to see whether $SAD_{MC} > SAD_{GC}$ and a flag is set to either MC mode or global codebook mode according to the outcome of the test. If MC is chosen, the current macroblock is coded using the standard motion compensation algorithms. If global codebook mode is chosen, it is coded using global codebook prediction (FIG. 14).

Once the difference macroblock is determined, the current macroblock is encoded. There are three cases: 1. If DC is used, the information to be coded is the mean values and the difference macroblock. 2. If MC is chosen, the information to be coded is the motion vector and the difference macroblock. 3. If global codebook is chosen, the information to be coded is the entry number of the global codebook match and the difference macroblock. In all three cases, the coding of difference macroblock shares the same procedure as in the standard MPEG or H.261/263.

Compared to the standard code stream of H.261/263 or MPEG, the GCAMC bit stream syntax is different whenever DC or global codebook is chosen. Specifically, if DC or global codebook is used, the mean values or the global codebook entry number is put into the bit stream instead of the prior art motion vector. The COD field of each macroblock header is modified to indicate if this macroblock is coded using DC, GC, or MC, so that the decoder can decode it properly. For this purpose, a new COD table is created in the GCAMC coding system and used to code each macroblock in new syntax.

The original table in H.263 for coding COD is:

int cumf_COD[3]={16383, 6849, 0}, while the table for the present invention is:

int globalcodebook_cumf_COD[6]={16383, 6849,
        3456, 1234, 456, 68, 0}.

FIG. 9 is a diagram of the invented algorithm for the decoder portion of the present invention. For each macroblock, the header is checked to see if it is coded using GC, MC, or DC mode. If it is coded using global codebook mode, the global codebook entry number is extracted from the bit stream and the current macroblock is reconstructed using the global codebook entry and the difference macroblock. If the current macroblock is coded in MC mode, it is reconstructed using the standard motion compensation algorithm. Otherwise, it is reconstructed using the DC value and the difference macroblock. After decoding, the global codebook is updated dynamically.

FIG. 10 illustrates the logic process of updating the global codebook. The global codebook contains the information of coded macroblocks in the coding history for the purpose of predicting future macroblocks. The manner in which the global codebook is updated plays an extremely important role in making good predictions. The strategy for the update is designed to achieve an adaptive vector quantization in the motion space, so that the content of the global codebook can always represent a good model for the video history. In implementing this strategy the present embodiment takes two basic approaches: (a) the recently reconstructed macroblocks are given more attention than older macroblocks and (b) global codebook entries that are unused for a certain number of frames are discarded to make room for new entries.

After reconstruction of a certain number of macroblocks using motion compensation or global codebook entry, the global codebook is updated to reflect the nature of the recent video history. In a preferred embodiment of the present invention, the global codebook is updated after every macroblock reconstruction.

Four scenarios are distinguished in updating the global codebook:

1. The current macroblock is reconstructed using a global codebook entry, and the SAD between the reconstructed macroblock and the corresponding global codebook entry is smaller than $\theta_{merge}$, the predetermined threshold for merging with the global codebook entry. Since the reconstructed macroblock is close to the global codebook match, this fact suggests that the two macroblocks (i.e., the reconstructed macroblock and the global codebook entry) should be merged.
2. The current macroblock is reconstructed using a global codebook entry, however, the SAD is greater than $\theta_{merge}$. This case indicates that the reconstructed macroblock is not sufficiently similar to the global codebook math even thought it was encoded using the global codebook entry. In this case, the reconstructed macroblock is considered to be a novel pattern and is added to the GC.
3. The current macroblock is reconstructed using motion compensation, and the SAD between the reconstructed macroblock and its corresponding prediction macroblock is smaller than $\theta_{merge}$. It means that the prediction macroblock is a good model for the current macroblock. Since this good model is not present in the global codebook—otherwise it would have been found in the global codebook during the encoding stage—, it is added to the global codebook as a new entry and then merged with the reconstructed macroblock.
4. The current macroblock is reconstructed using motion compensation, and the SAD is larger than the threshold $\theta_{merge}$. In this case, the prediction macroblock is considered to be a novel pattern and is added to the global codebook.

Of note is the fact that only in one scenario—in case 2 above—is the current reconstructed macroblock added to the global codebook as a novel pattern. Since this current macroblock usually and not surprisingly carries the freshest information regarding the video content, it may be beneficial for it to be added to the global codebook regardless which case is encountered. As another embodiment of the current invention, this may be called the accelerated mode for global codebook update which includes this optional operation for any of the listed scenarios, and can be set to On or Off at the direction of the user.

FIG. 11 shows the algorithm used when adding a new entry to the global codebook. The global codebook is first checked to see if there is free space for the new entry. If there is a free space, the new entry is inserted to that place and the global codebook counter is increased by 1. In the event that there is no space remaining in the global codebook, the entry with the smallest population is removed from the global codebook (FIG. 12 below) and is replaced with the new entry.

FIG. 12 shows the algorithm to remove the entry with smallest population from the global codebook. The global codebook is searched from start to end for the entry with the smallest population. This entry is then removed from the global codebook to provide room for the addition of the new entry.

In order to protect the most recent entries from being removed from the global codebook (they usually have relatively small populations and are thus vulnerable to this deleting/replacing operation), the frame number of the candidate for removal is checked to make sure that it is old enough to be discarded.

FIG. 13 illustrates the process of merging the reconstructed macroblock with a global codebook entry. The merge function occurs in two stages: one each for luminance and chrominance. Each data value of the global codebook entry is replaced by the average of itself and the corresponding pixel value in the reconstructed block.

FIG. 14 shows the logic of updating a prediction macroblock and the associated difference macroblock using a global codebook entry. The global codebook entry is used as the prediction macroblock. The difference macroblock is updated to be the difference between the current macroblock and the global codebook entry.

FIG. 15 shows the process of searching the global codebook for the best match in terms of SAD. The SAD calculation involves both luminance and chrominance and the function returns the global codebook entry number that gives the smallest SAD.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for encoding video data, the method comprising the steps of:
    a. providing a global codebook (gc) comprising one or more gc-macroblocks;
    b. decomposing a current frame of the video data into current macroblocks and searching for best gc-matches, each best gc-match identifying one gc-macroblock that best matches one current macroblock;
    c. determining best mc-matches provided by a motion compensation (mc) scheme, and, for each current macroblock, comparing the best gc-match associated with the each current macroblock to the best mc-match associated with the each current macroblock;
    d. choosing the better of the best gc-match associated with the each current macroblock and the best mc-match associated with the each current macroblock for encoding the each current macroblock and encoding the each current macroblock;
    e. updating the global codebook.

2. The method of claim 1 wherein the one or more gc-macroblocks comprise data sets for luminance, chrominance, frame number and population.

3. The method of claim 1 wherein the one or more gc-macroblocks have variable size and shape.

4. The method of claim 1 wherein the global codebook is initially composed during a training mode using data derived from sample video content.

5. The method of claim 1 wherein the each current macroblock is encoded using mean values of all luminance and chrominance values of the current macroblocks in the current frame.

6. The method of claim 1 wherein the global codebook is updated with recently used gc-macroblocks.

7. The method of claim 1 and further comprising the step of updating the global codebook with one or more new macroblocks, wherein for each of the best gc-matches, a new macroblock is determined using the one gc-macroblock and the current macroblock associated with the each best gc-match.

8. The method of claim 1 wherein the global codebook is updated using one or more of the current macroblocks associated with the best gc-matches.

9. The method of claim 1 wherein updating the global codebook comprises a combination of steps, including replacing gc-macroblocks in the global codebook, adding gc-macroblocks to the global codebook and deleting gc-macroblocks from the global codebook.

10. The method of claim 1 wherein the global codebook comprises gc-macroblocks originating from one or more frames.

11. An apparatus for encoding video data, the apparatus comprising:
   a. a global codebook (gc) comprising one or more gc-macroblocks;
   b. means for decomposing a current frame of the video data into current macroblocks and searching for best gc-matches, each best gc-match identifying one gc-macroblock that best matches one current macroblock;
   c. means for determining best mc-matches provided by a motion compensation (mc) scheme and, for each current macroblock, comparing the best gc-match associated with the each current macroblock to the best mc-match associated with the each current macroblock;
   d. means for choosing the better of the best gc-match and the best mc-match for encoding each current macroblock and means for encoding the each current macroblock;
   e. means for updating the global codebook.

12. The apparatus of claim 11 wherein the one or more gc-macroblocks comprise data sets for luminance, chrominance, frame number and population.

13. The apparatus of claim 11 wherein the one or more gc-macroblocks have variable size and shape.

14. The apparatus of claim 11 wherein the global codebook is initially composed during a training mode using data derived from sample video content.

15. The apparatus of claim 11 wherein the current macroblock is coded using the mean values of all luminance and chrominance values for the current macroblocks in the current frame.

16. The apparatus of claim 11 wherein the global codebook is updated with recently used gc-macroblocks.

17. The apparatus of claim 11 wherein the global codebook is updated with one or more new macroblocks, and wherein, for each of the best gc-matches a new macroblock is determined using the gc-macroblock and the current macroblock of the best gc-match.

18. The apparatus of claim 11 wherein the global codebook is updated using one or more of the current macroblocks associated with the best gc-matches.

19. The apparatus of claim 11 wherein updating the global codebook comprises a combination of steps including replacing gc-macroblocks in the global codebook, adding gc-macroblocks to the global codebook, and deleting gc-macroblocks from the global codebook.

20. The apparatus of claim 11 wherein the global codebook comprises gc-macroblocks originating from one or more frames.

* * * * *